(12) United States Patent
Hatta

(10) Patent No.: US 9,497,831 B2
(45) Date of Patent: Nov. 15, 2016

(54) ILLUMINATION SYSTEM AND ILLUMINATION APPARATUS USED THEREFOR

(71) Applicant: PANASONIC INTELLECTUAL PROPERTY MANAGEMENT CO., LTD., Osaka (JP)

(72) Inventor: Kazuhiro Hatta, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/847,111

(22) Filed: Sep. 8, 2015

(65) Prior Publication Data

US 2016/0081163 A1 Mar. 17, 2016

(30) Foreign Application Priority Data

Sep. 12, 2014 (JP) ................................. 2014-186268

(51) Int. Cl.
*H05B 37/02* (2006.01)

(52) U.S. Cl.
CPC ...... *H05B 37/0227* (2013.01); *H05B 37/0245* (2013.01); *H05B 37/0281* (2013.01)

(58) Field of Classification Search
None
See application file for complete search history.

(56) References Cited

U.S. PATENT DOCUMENTS

| 2010/0277316 A1* | 11/2010 | Schlangen et al. | ... A61M 21/00 340/540 |
| 2012/0206050 A1* | 8/2012 | Spero | ....................... B60Q 1/04 315/152 |

FOREIGN PATENT DOCUMENTS

JP H4-264289 9/1992

OTHER PUBLICATIONS

U.S. Appl. No. 14/848,473 to Naohiro Toda et al., filed Sep. 9, 2015.
U.S. Appl. No. 14/687,043 to Hikaru Maeda et al., filed Apr. 15, 2015.

\* cited by examiner

*Primary Examiner* — Jany Richardson
(74) *Attorney, Agent, or Firm* — Greenblum & Bernstein, P.L.C.

(57) ABSTRACT

An illumination system includes a plurality of illumination apparatuses including a sleeping location illumination apparatus provided near a sleeping location. Each of the illumination apparatuses has a light source configured to irradiate an illumination light, a control unit configured to control lighting of the light source, and a transceiver configured to transmit and receive a control signal including a lighting signal for lighting the light source. A control unit of at least one of the illumination apparatuses turns on the light source before a preset wake-up time and controls the transceiver to transmit the control signal to another illumination apparatus.

17 Claims, 10 Drawing Sheets

ILLUMINATION SYSTEM AND ILLUMINATION APPARATUS USED THEREFOR

CROSS-REFERENCE TO RELATED APPLICATIONS

This application claims priority to Japanese Patent Application No. 2014-186268 filed on Sep. 12, 2014, the entire contents of which are incorporated herein by reference.

TECHNICAL FIELD

The disclosure relates to an illumination system that realizes an adequate illumination environment for waking up and an illumination apparatus used therefor.

BACKGROUND ART

Conventionally, there is known an alarm illumination apparatus in which brightness of a light source is gradually increased during a predetermined period of time before a preset wake-up time so that a sleeping person can wake up pleasantly at the preset wake-up time (see, e.g., Japanese Unexamined Patent publication No. H4-264289). This illumination apparatus can effectively wake up a sleeping person with light stimulus.

However, when the illumination apparatus is installed at a location separated from a sleeping location, for example, it is difficult for a sleeping person to feel changes in brightness of an illumination light and, thus, it is not possible to effectively wake up the sleeping person. On the other hand, when only illumination apparatus installed near the sleeping location is turned on, changes in the brightness give a strong stimulus to the sleeping person and, thus, the sleeping person cannot wake up pleasantly.

SUMMARY OF THE INVENTION

In view of the above, the disclosure provides an illumination system capable of waking up a sleeping person pleasantly by providing an appropriate illumination environment for waking up and an illumination apparatus used therefor.

In accordance with an embodiment of the disclosure, there is provided a illumination system including: a plurality of illumination apparatuses including a sleeping position illumination apparatus provided near a sleeping location, wherein each of the illumination apparatuses has a light source configured to irradiate an illumination light, a control unit configured to control lighting of the light source, and a transceiver configured to transmit and receive a control signal including a lighting signal for lighting the light source, wherein a control unit of at least one of the illumination apparatuses turns on the light source before a preset wake-up time and controls the transceiver to transmit the control signal to another illumination apparatus.

In the disclosure, one illumination apparatus is turned on before a preset wake-up time and transmits a control signal to another illumination apparatus, so that different illumination apparatuses operate in synchronization with each other. Accordingly, an appropriate illumination environment for waking up can be provided and a sleeping person can wake up pleasantly.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Figure 1:
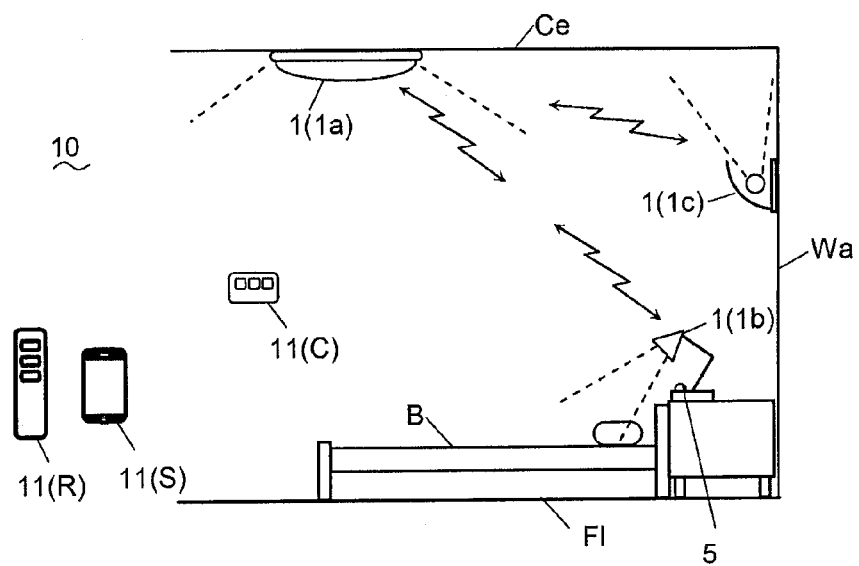
FIG. 1 shows an indoor space to which an illumination system according to an embodiment is applied.
Figure 2A:
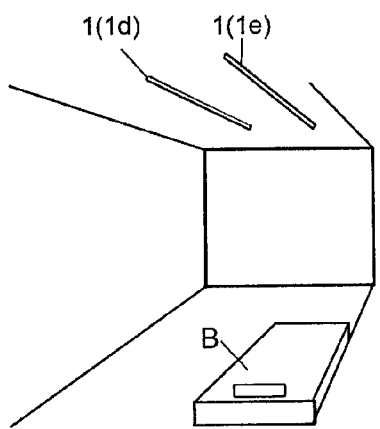
FIGS. 2A and 2B are perspective views showing an example of an illumination apparatus used for the illumination system.
Figure 2B:
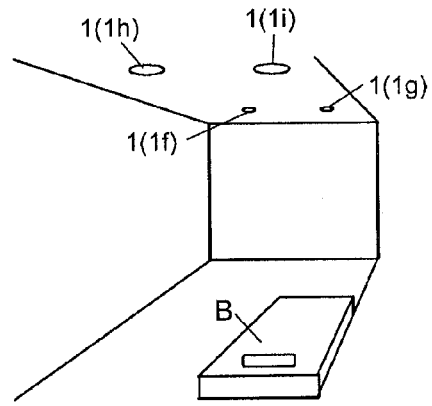

An illumination system according to an embodiment and an illumination apparatus used therefor will be described with reference to FIGS. 1 to 11H. As shown in FIG. 1, an illumination system 10 according to an embodiment includes a plurality of illumination apparatuses 1 (1a, 1b, 1c) and a terminal 11 for controlling lighting thereof. The illumination apparatus 1 is used for a bedroom where a bed B (sleeping place) is provided as illustrated. The illumination apparatus 1 controls brightness of an indoor space by irradiating an illumination light to a wall Wa, a ceiling Ce, and a floor Fl of the bedroom. The lighting of the illumination apparatus 1 can be controlled by user's manipulation of the terminal 11. As for the terminal 11, there may be used a controller C attached to the wall, a remote controller R dedicated for the illumination apparatus 1, and an information communication terminal S such as a smart phone, a tablet terminal or the like.

As illustrated, the illumination apparatus 1 may be a ceiling light 1a attached to the ceiling Ce, a sleeping location illumination apparatus (e.g. a stand light 1b) installed near the bed B, a bracket 1c attached to the wall Wa, or the like. Further, the illumination apparatus 1 may include base lights 1d and 1e each having a linear light source shown in FIG. 2A, a ceiling embedded type down lights 1f to 1i shown in FIG. 2B, or various illumination devices.

Figure 3:
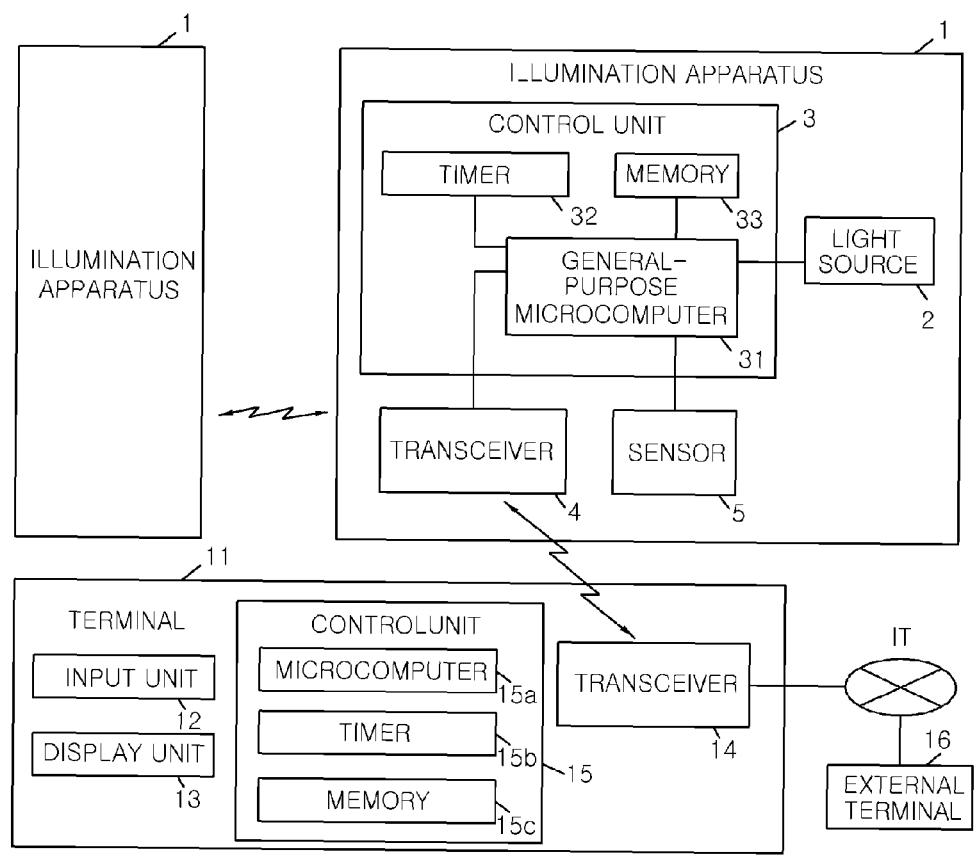
FIG. 3 is a block diagram of the illumination system.

As shown in FIG. 3, the illumination apparatus 1 includes a light source 2 for irradiating an illumination light, a control unit 3 for controlling lighting of the light source 2, and a transceiver 4 for transmitting and receiving a control signal or the like to and from the terminal 11 and another illumination apparatus 1.

As for the light source 2, it is preferable to use an LED package coated with a wavelength conversion member for converting a wavelength of an emitted light of an LED chip. In the LED chip, a color temperature of the light emitted from the light source 2 is preferably in the range from a daylight color to a light bulb color (color temperature from 7100K to 2600K). Further, a light source capable of varying a color temperature of an emitted light is preferably used as for the light source 2. The light source 2 may be an organic EL, a fluorescent light, a light bulb or the like, other than the LED.

The control unit 3 turns on or off the light source 2 based on a wireless signal received from the terminal 11. Here, the wireless communication includes infrared rays, radio waves and visible rays. Further, the control unit 3 performs dimming control of the light source 2 by PWM (Pulse Width Modulation) control, analog dimming control or the like, for example. The control unit 3 is realized mainly by a general-purpose microcomputer 31. A dimming ratio denotes a ratio of a luminance of the light source 2 with respect to a maximum luminance thereof. For example, a dimming ratio obtained when the control unit 3 performs dimming control of the light source 2 by the PWM control is determined by a duty ratio of a PWM signal. The control unit 3 includes a timer 32 for measuring time, and a memory 33 that stores data such as the dimming ratio of the light source 2 with respect to the time measured by the timer 32, attribute information of the illumination apparatus 1, or the like.

The transceiver 4 transmits and receives a control signal including a lighting signal for lighting the light source 2. The transceiver 14 performs communication by using, e.g., infrared ray communication, ZigBee (Registered Trademark) that is one of WPAN (Wireless Personal Area Network) standards, or another type of communication. The transceiver 4 may use illumination light communication, in which a communication signal is overlapped with the illumination light by modulating a lighting frequency of the light source 2. In this case, the illumination apparatus 1 includes a light receiving unit (not shown) for receiving an illumination light.

The illumination apparatus 1, e.g., the stand light 1b shown in FIG. 1, may include a sensor 5 for detecting movement of a user close thereto. The sensor 5 may be separately provided from the illumination apparatus 1 as long as it can transmit and receive detection information via the transceiver 4 of the illumination apparatus 1. The sensor 5 is, e.g., a motion sensor for detecting depth of sleeping by detecting a body movement such as toss and turn of a sleeping person or the like during sleeping. A time when a user falls asleep can be detected from user's movement. Further, the sensor 5 may be, e.g., an image sensor capable of detecting a user's sleeping state based on a direction of a user's face.

The terminal 11 includes an input unit 12 for setting a dimming mode of the illumination apparatus 1 for sleeping and waking up, a display unit 13 for displaying an input content, and a transceiver 14 (terminal transceiver) communicating with the illumination apparatus 1. The input unit 12 is an input interface and configured as, e.g., a push button-type switch, a touch panel or the like. The illumination apparatus 1 provided in places which can be easily manipulated by a user, e.g., the stand light 1b, may have an input interface having the same function as that of the input unit 12. As in the case of the transceiver 4 of the illumination apparatus 1, the transceiver 14 performs communication by using various types of communication such as infrared ray communication and the like. Further, the terminal 11 includes a control unit 15 having a microcomputer 15a for controlling the respective components, a timer 15b, and a memory 15c. In the case of using an information communication terminal as the terminal 11, the terminal 11 can be connected to an external terminal 16 such as an external server or the like via the Internet IT.

Figure 4A:
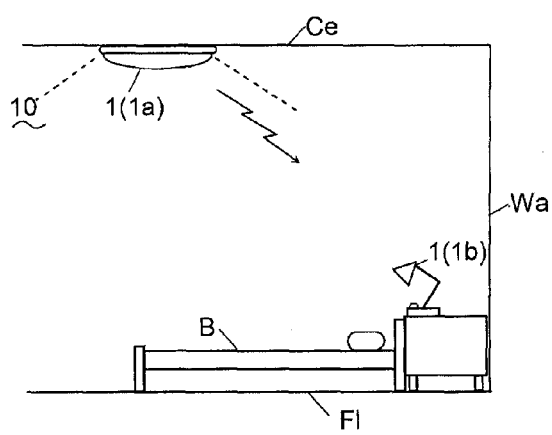
FIG. 4A is an indoor view showing an operation example of the illumination system and FIG. 4B is a time chart.
Figure 4B:
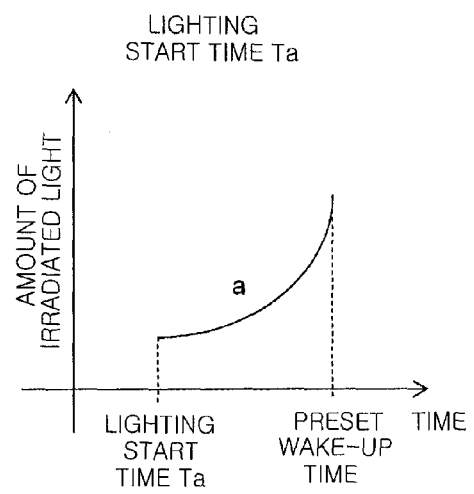

In the illumination system 10 of the present embodiment, a user can set a wake-up time in advance by manipulating the input unit 12 of the terminal 11. As shown in FIGS. 4A and 4B, at least one illumination apparatus 1 (the ceiling light 1a in the illustrated example) turns on the light source 2 at a lighting start time before a preset wake-up time T (The irradiation of the illumination light is indicated by a dashed line in FIG. 4A and the following drawings). The ceiling light 1a transmits a predetermined control signal to another illumination apparatus 1 (the stand light 1b in the illustrated example). The output of the wireless signal is indicated by a waveform arrow. The control unit 3 of the ceiling light 1a carries out such an operation by driving the transceiver 4 thereof. The control unit 3 of the ceiling light 1a can control to transmit the control signal to the transceiver 4 whether or not another illumination apparatus 1 exists near the ceiling light 1a. When the stand light 1b, for example, exists within a range that the control signal can be received, the stand light 1b performs predetermined operation based on the received control signal. When there is no illumination apparatus 1 that receives the control signal, the ceiling light 1a turns on the light source 2 so that the amount of light irradiated to a user reaches a preset value. The ceiling light 1a is turned off at the preset wake-up time T.

Figure 5A:
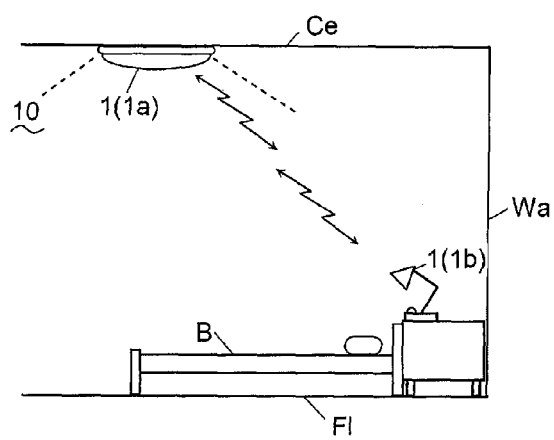
FIGS. 5A and 5C are indoor views showing an operation example of the illumination system and FIGS. 5B and 5D are time charts.
Figure 5B:
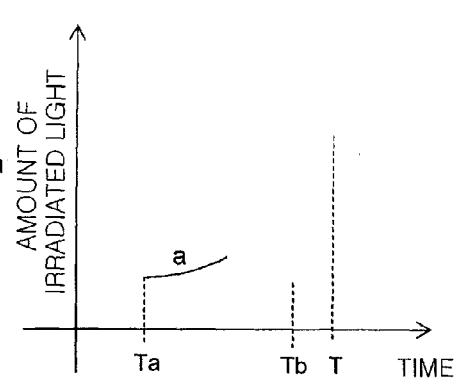

The control signal received and transmitted between the illumination apparatuses 1 includes a lighting control signal for lighting the illumination apparatus 1 of the reception side and various attribute signals. The lighting control signal contains identification information of a transmission side and a reception side, the lighting start time T and an irradiation pattern (including a dimming ratio, a temporal change of the dimming ratio or the like). As shown in FIGS. 5A and 5B, for example, the ceiling light 1a is turned on at the lighting start time Ta before the preset wake-up time T. At this time, the control unit 3 of the ceiling light 1a controls lighting of the light source 2 such that the amount of light irradiated to the user is gradually increased in an exponential manner as it gets closer to the preset wake-up time T. Then, the ceiling light 1a transmits a predetermined control signal before the preset wake-up time T. The control signal includes a lighting signal for starting lighting of the illumination apparatus 1 other than the ceiling light 1a at the lighting start time Tb immediately before the preset wake-up time T.

Figure 5C:
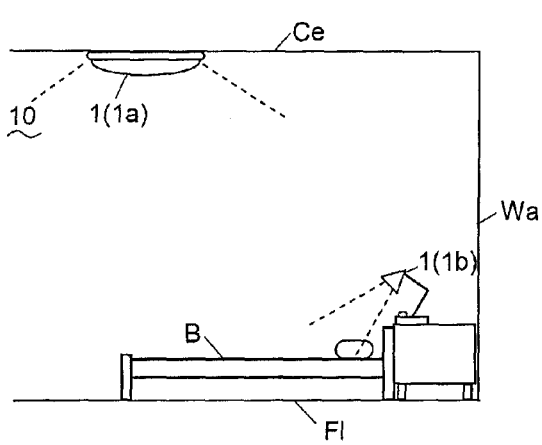
Figure 5D:
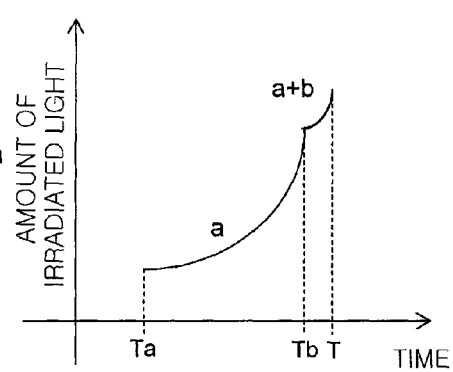
Figure 6A:
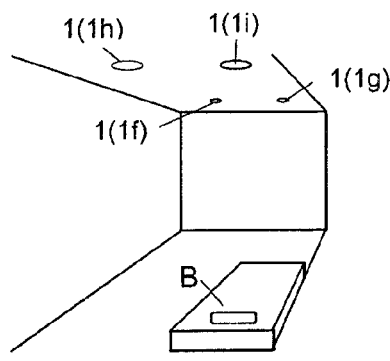
FIGS. 6A to 6E are indoor views showing an operation example of the illumination system.
Figure 6B:
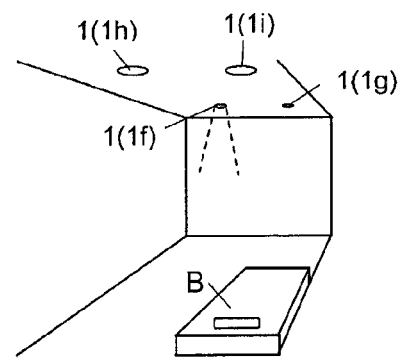
Figure 6C:
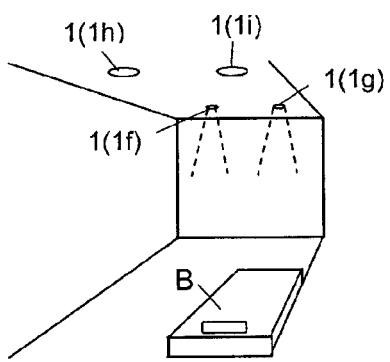
Figure 6D:
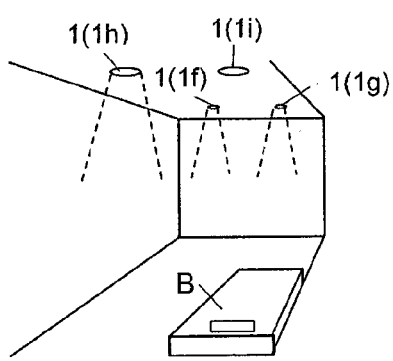
Figure 6E:
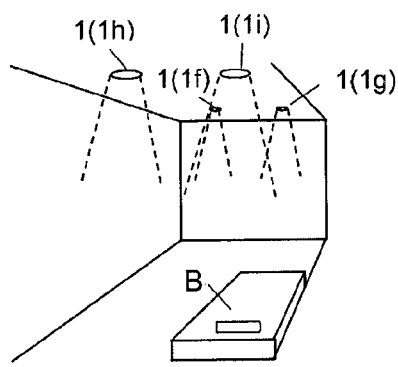

As shown in FIGS. 5C and 5D, the stand light 1b that has received the control signal is turned on at the lighting start time Tb. By irradiating an illumination light from the stand light 1b in addition to the ceiling light 1a, a larger amount of light can be irradiated to a user sleeping on the bed B.

In this operation example, at the lighting start time of the stand light 1b, a user is already exposed to a large amount of light irradiated from the ceiling light 1a. Therefore, the user is not stressed by a strong stimulus caused by changes in the brightness. The user can wake up pleasantly with a sufficient amount of light. In the illumination system 10, one illumination apparatus 1 transmits a control signal to another illumination apparatus 1, so that different illumination apparatuses operate in synchronization with each other. Accordingly, it is possible to provide an appropriate illumination environment for waking up so that a sleeping person can wake up pleasantly.

The control signal contains the attribute information of the illumination apparatuses 1. The control signal is transmitted and received between the illumination apparatuses 1 before the preset wake-up time T. A lighting start time T of each illumination apparatus 1 is set based on the attribute information. Specifically, the attribute information contains information on a distance from the illumination apparatus 1 to a sleeping location (the bed B). The illumination apparatus 1 far from the sleeping location is turned on earlier. In the example shown in FIGS. 5A to 5D, the ceiling light 1a is far from the bed B compared to the stand light 1b. Therefore, the ceiling light 1a is turned on an earlier lighting start time Ta and the stand light 1b that has received the control signal from the ceiling light 1a is turned on at a later lighting start time Tb.

In this operation example, the illumination apparatuses 1 are turned on in descending order of a distance from the sleeping location, so that a user is not stressed by a strong stimulus caused by changes in the brightness. The illumination apparatus 1 close to the sleeping location is turned on immediately before the preset wake-up time T. Therefore, the user can wake up pleasantly with a sufficient amount of light.

This operation example can be applied to the lighting control of the down lights 1f to 1h as shown in FIGS. 6A to 6E, for example. Therefore, the down lights 1f to 1h are turned on in descending order of a distance from the bed B as illustrated. In this operation example, such as example shown in FIGS. 5A to 5D, the user is not stressed by a strong stimulus caused by changes in the brightness when the down light 1f far from the bed B is turned on and a sufficient amount of light can be irradiated to the user until the down light 1h close to the bed B is turned on. Accordingly, the user can wake up pleasantly. Further, in this operation example, the number of illumination apparatuses 1 turned on is increased as time elapses, so that the brightness of the room is increased and the amount of light irradiated to the user is increased. Therefore, this operation example can be applied to the illumination apparatus 1 having no dimming function.

Figure 7A:
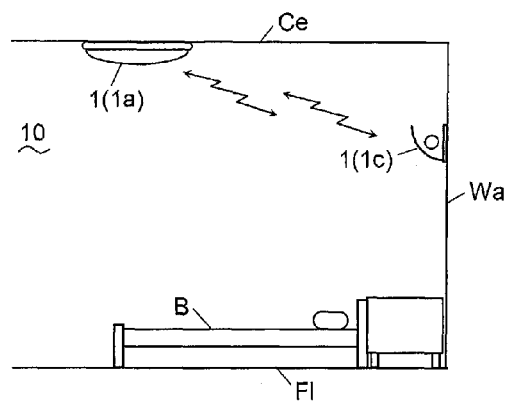
FIGS. 7A, 7C and 7E are indoor views showing an operation example of the illumination system
Figure 7B:
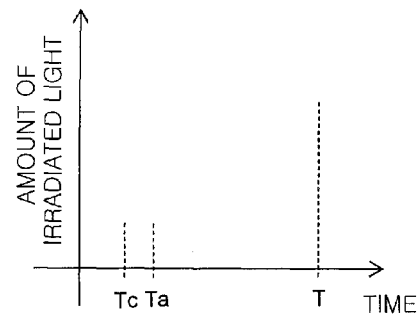
FIGS. 7B, 7D and 7F are time charts.
Figure 7C:
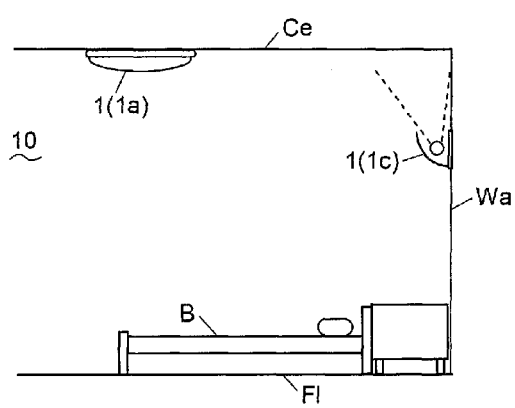
Figure 7D:
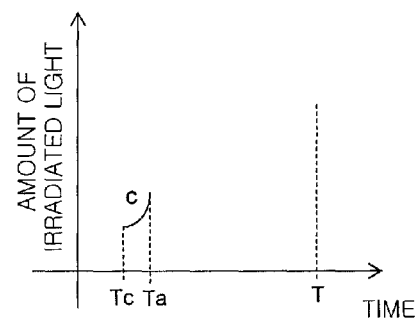
Figure 7E:
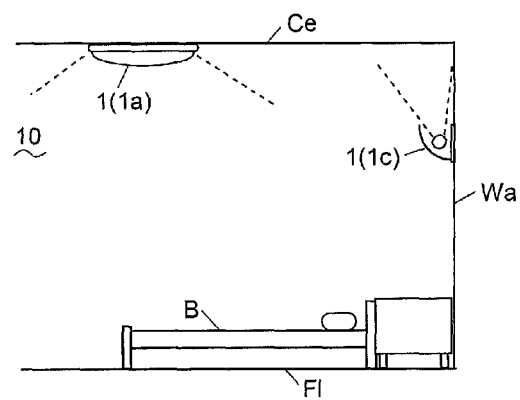
Figure 7F:
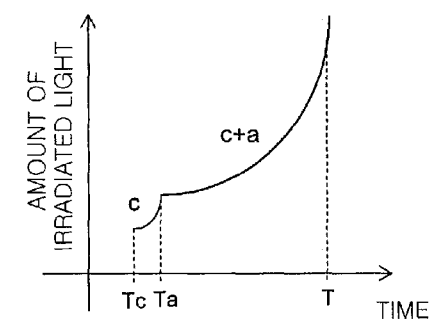

The attribute information includes lighting output information of the illumination apparatus 1. The illumination apparatus 1 having a low lighting output is turned on earlier. In the example shown in FIGS. 7A to 7F, the bracket 1c is set to have a lighting output lower than that of the ceiling light 1a. In that case, as can be seen from FIGS. 7A and 7B, the attribute information on the lighting output information is transmitted and received between the ceiling light 1a and the bracket 1c and the lighting start times are determined such that a lighting start time Tc of the bracket 1c having a low lighting output becomes earlier than the lighting start time Ta of the ceiling light 1a. As shown in FIGS. 7C and 7D, after the bracket 1c is turned on at the lighting start time Tc, the ceiling light 1a is turned on at the lighting start time Ta as shown in FIGS. 7E and 7F.

In this operation example, the illumination apparatuses 1 are turned on in ascending order of the lighting output, so that a user is not stressed by a strong stimulus caused by changes in the brightness.

Figure 8A:
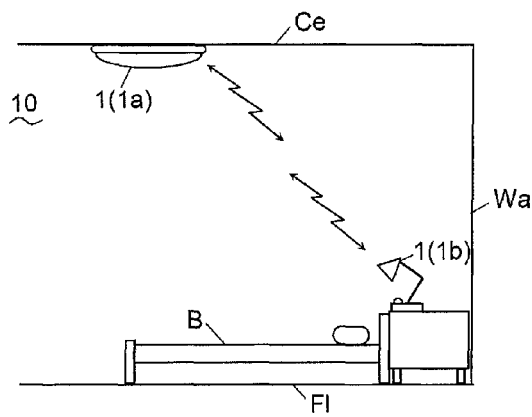
FIGS. 8A, 8C and 8E are indoor views showing an operation example of the illumination system
Figure 8B:
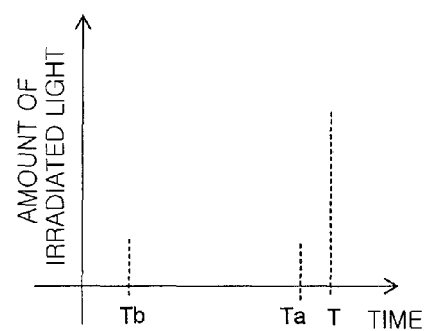
FIGS. 8B, 8D and 8F are time charts.
Figure 8C:
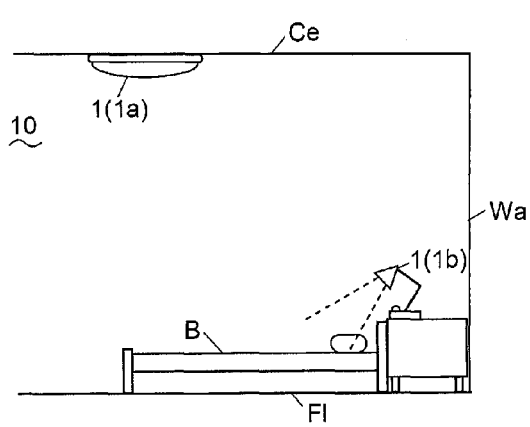
Figure 8D:
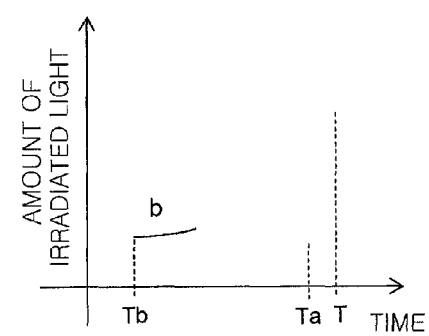
Figure 8E:
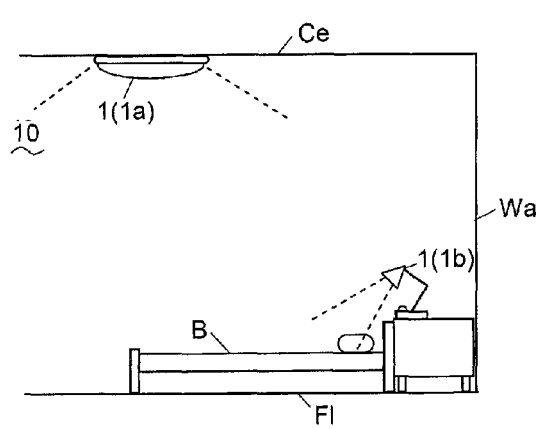
Figure 8F:
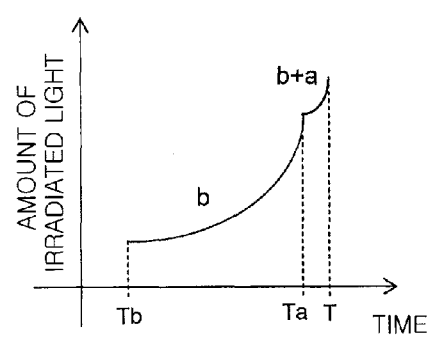
Figure 9A:
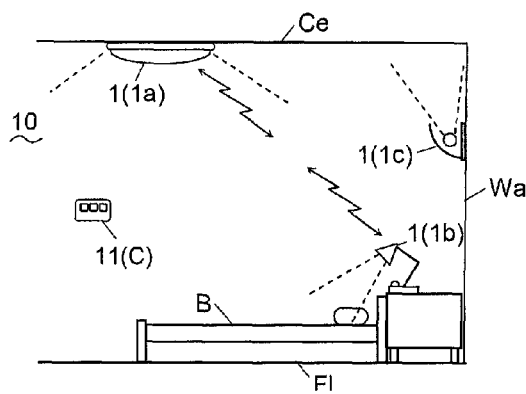
FIG. 9A is an indoor view showing an operation example of the illumination system and FIG. 9B is a time chart.
Figure 9B:
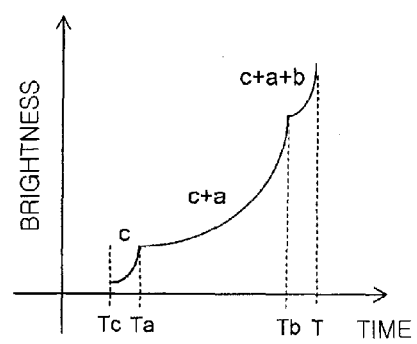

The attribute information contains light distribution information of the illumination apparatus 1. The illumination apparatus 1 having a small light distribution angle is turned on earlier. In the example shown in FIGS. 8A to 8F, the light distribution angle of the stand light 1b is set to be smaller than that of the ceiling light 1a. In that case, as can be seen from FIGS. 8A and 8B, the attribute information on the light distribution information is transmitted and received between the ceiling light 1a and the stand light 1b and the lighting start times are determined such that the lighting start time Tb of the stand light 1b having a small light distribution angle becomes earlier than a lighting start time Ta of the ceiling light 1a. After the stand light 1b is turned on at the lighting start time Tb as shown in FIGS. 8C and 8D, the ceiling light 1a is turned on at the lighting start time Ta as shown in FIGS. 8E and 8F.

In this operation example, the illumination apparatuses 1 are turned on in ascending order of the light distribution angle. Therefore, a user close to the illumination apparatus 1 having a small light distribution angle is stimulated by a light with a constant brightness. The brightness in the indoor space is suppressed at the time when the lighting is started, and the amount of light irradiated to the user is gradually increased. Accordingly, a specific user can wake up with light stimulus. For example, even when the bed B is located at a position where the light from the ceiling light 1a hardly reaches, it is possible to wake up a user by disposing the illumination apparatus 1 having a small light distribution angle near the bed B.

In the illumination system 10, the distance information, the lighting output information and the light distribution angle which serve as the attribute information are used independently or in combination to determine the lighting start time of each illumination apparatus 1. The attribute information is inputted and set by user's manipulation of the controller C. The lighting of three or more number of illumination apparatuses 1 is also controlled in the above-described manner. The lighting start order of the illumination apparatuses 1 is basically determined in ascending order of the level of stimulus of the light irradiated to a sleeping user. In the operation example shown in FIGS. 9A and 9B, for example, the bracket 1c, the ceiling light 1a and the stand light 1b are turned on in that order at the lighting start times Tc, Ta and Tb, respectively.

The user can set the lighting start time by manipulating the controller C without requiring the attribute information. The controller C can be manipulated so that a specific illumination apparatus 1 serving as a master receives the control signal transmitted and received between the illumination apparatuses 1 and then the specific illumination apparatus 1 transmits the received control signal to another illumination apparatus 1 serving as a slave.

Figure 10A:
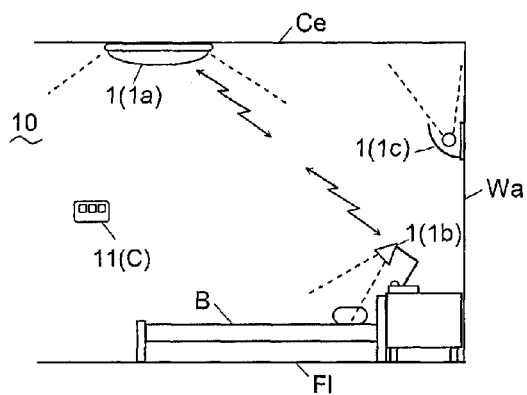
FIG. 10A is an indoor view showing an operation example of the illumination system and FIG. 10B is a time chart.
Figure 10B:
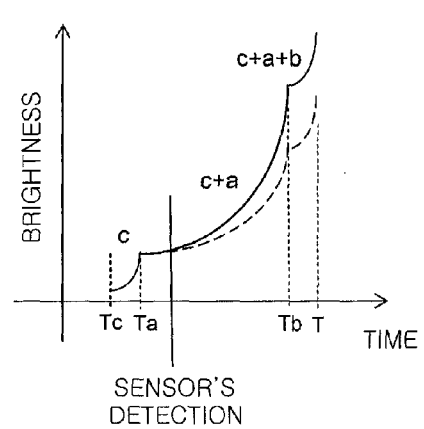

As shown in FIG. 10A, the illumination apparatus 1 (the stand light 1b in this example) includes a sensor 5 for detecting a user's sleeping state. The control signal contains detection information of the sensor 5. Each illumination apparatus 1 sets a lighting output thereof based on the detection information. As shown in FIG. 10B, for example, in the case of detecting a user in deep sleep, the control signal is transmitted to each illumination apparatus 1 so that the amount of light irradiated to the user is increased. In this example, the lighting output of the ceiling light 1a is increased to increase the amount of light irradiated to the user in the state where a user is in deep sleep (indicated by a solid line) compared to in the state where a user is not in deep sleep (indicated by a dashed line). By increasing the stimulus due to changes in the illumination light, it is possible to effectively wake up a user in deep sleep.

In the operation example shown in FIGS. 11A to 11H, a user can set at least two wake-up times T1 and T2 by using the input unit 12 (see FIG. 2) of the terminal 11 of the illumination apparatus 1. As can be seen from FIGS. 11A and 11B, when the wake-up times T1 and T2 are set, the attribute information on, e.g., the light distribution information, is transmitted and received between the ceiling light 1a and the stand light 1b. The lighting start times of the illumination apparatuses are determined respectively such that the lighting start time Tb of the stand light 1b having a small light distribution angle becomes earlier than the lighting start time Ta of the ceiling light 1a. The lighting start time Tb of the stand light 1b corresponds to the preset wake-up time T1 and the lighting start time Ta of the ceiling light 1a corresponds to the preset wake-up time T2.

Figure 11A:
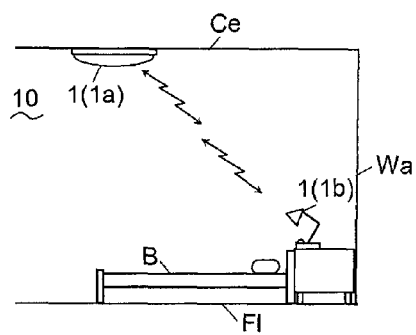
FIGS. 11A, 11C, 11E and 11G are indoor views showing an operation example of the illumination system
Figure 11B:
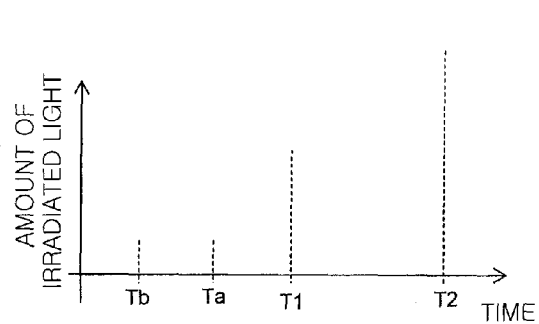
FIGS. 11B, 11D, 11F and 11H are time charts.
Figure 11C:
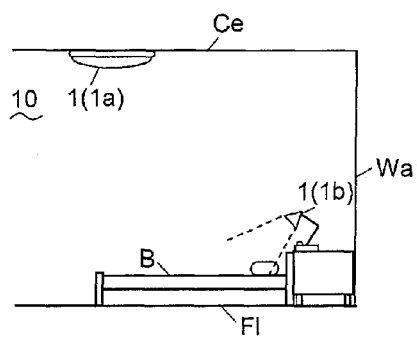
Figure 11D:
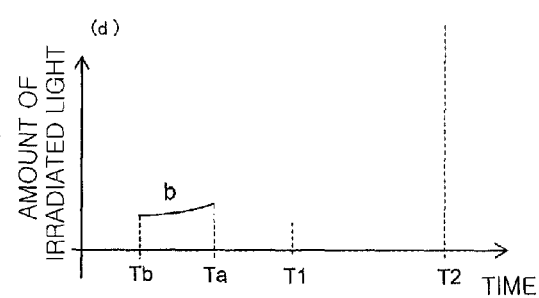
Figure 11E:
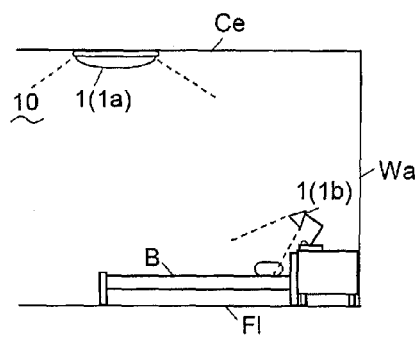
Figure 11F:
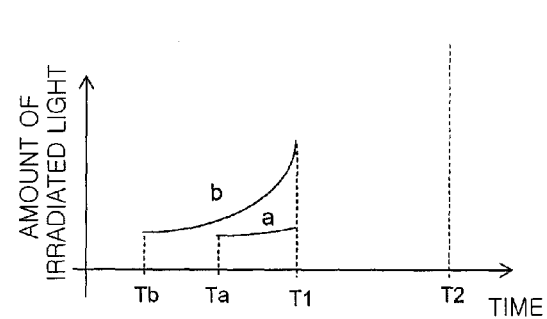
Figure 11G:
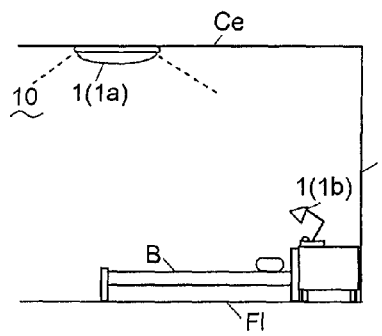
Figure 11H:
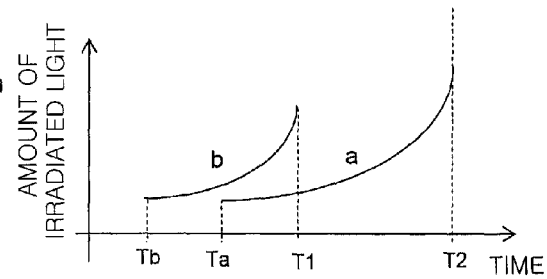

After the stand light 1b is turned on at the lighting start time Tb as shown in FIGS. 11C and 11D, the ceiling light 1a is turned on at the lighting start time Ta as shown in FIGS. 11E and 11F. As shown in FIGS. 11G and 11H, the stand light 1b is turned off at the preset wake-up time T1 and the ceiling light 1a is turned off at the preset wake-up time T2.

This operation example is applied to the case in which a plurality of users including a specific person having early preset wake-up time and another person having late preset wake-up time sleeps in a bedroom. In this case, the former is woken up by the light from the stand light 1b and the latter is woken up by the light from the ceiling light 1a. Accordingly, the illumination system 1 can cope with a plurality of preset wake-up times of a plurality of users.

The disclosure is not limited to the above-described embodiment and may be variously modified. For example, the illumination system 10 can be connected to various networks or a ground system by connecting the transceiver 14 of the terminal 11 to the external terminal 16 via the Internet IT. Accordingly, user can compare or refer to another user's information on waking up at regular intervals. In addition, there may be introduced a service for providing advice on an illumination environment for waking up or a service for setting an illumination environment for waking up with user.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An illumination system comprising:
a plurality of illumination apparatuses including a sleeping location illumination apparatus provided near a sleeping location,
wherein each of the illumination apparatuses has a light source configured to irradiate an illumination light, a central processing unit (CPU) configured to control lighting of the light source, and a transceiver configured to transmit and receive a control signal including a lighting signal for lighting the light source,
wherein, in at least one of the illumination apparatuses, the CPU turns on the light source before a preset wake-up time and controls the transceiver to transmit the control signal to another illumination apparatus,
wherein the control signal includes attribute information of the at least one of the illumination apparatuses,
wherein, before the preset wake-up time, each of the illumination apparatuses transmits and receives the control signal and sets respective lighting start times based on the attribute information, and
wherein the attribute information includes at least one of information on a distance from each of the illumination apparatuses to the sleeping location, lighting output information of each of the illumination apparatuses, and light distribution information of each of the illumination apparatuses.

2. The illumination system of claim 1, wherein the attribute information includes the information on the distance from each of the illumination apparatuses to the sleeping location.

3. The illumination system of claim 2, wherein the attribute information further includes the lighting output information of each of the illumination apparatuses.

4. The illumination system of claim 3, wherein the attribute information further includes the light distribution information of each of the illumination apparatuses.

5. The illumination system of claim 3, wherein at least one of the illumination apparatuses further includes a sensor configured to detect a user's sleeping state,
wherein the control signal further includes detection information of the sensor, and
wherein the plurality of illumination apparatuses sets respective lighting start times based on the detection information.

6. The illumination system of claim 3, wherein at least one of the illumination apparatuses includes an input for setting the preset wake-up time,
wherein the input configured to allow two or more the preset wake-up times to be set.

7. The illumination system of claim 2, wherein the attribute information further includes the light distribution information of each of the illumination apparatuses.

8. The illumination system of claim 2, wherein at least one of the illumination apparatuses further includes a sensor configured to detect a user's sleeping state,
wherein the control signal further includes detection information of the sensor, and
wherein the plurality of illumination apparatuses sets respective lighting start times based on the detection information.

9. The illumination system of claim 2, wherein at least one of the illumination apparatuses includes an input for setting the preset wake-up time,
wherein the input configured to allow two or more the preset wake-up times to be set.

10. The illumination system of claim 1, wherein the attribute information includes the lighting output information of each of the illumination apparatuses.

11. The illumination system of claim 10, wherein the attribute information further includes the light distribution information of each of the illumination apparatuses.

12. The illumination system of claim 10, wherein at least one of the illumination apparatuses further includes a sensor configured to detect a user's sleeping state,
wherein the control signal further includes detection information of the sensor, and
wherein the plurality of illumination apparatuses sets respective lighting start times based on the detection information.

13. The illumination system of claim 10, wherein at least one of the illumination apparatuses includes an input for setting the preset wake-up time,
wherein the input configured to allow two or more the preset wake-up times to be set.

14. The illumination system of claim 1, wherein the attribute information includes the light distribution information of each of the illumination apparatuses.

15. The illumination system of claim 1, wherein at least one of the illumination apparatuses further includes a sensor configured to detect a user's sleeping state,
wherein the control signal further includes detection information of the sensor, and wherein the plurality of illumination apparatuses sets respective lighting start times based on the detection information.

16. The illumination system of claim 1, wherein at least one of the illumination apparatuses includes an input for setting the preset wake-up time,
wherein the input configured to allow two or more the preset wake-up times to be set.

17. An illumination apparatus used for the illumination system described in claim 1.

* * * * *